US012779453B2

(12) United States Patent
Lamport et al.

(10) Patent No.: US 12,779,453 B2
(45) Date of Patent: Nov. 3, 2026

(54) FLUID PROCESSING SYSTEM

(71) Applicant: Sartorius Stedim Biotech GmbH, Göttingen (DE)

(72) Inventors: Kevin Ashley Lamport, Wickham (GB); Natasha Jayne Kelly, Stoke-on-Trent (GB)

(73) Assignee: Sartorius Stedim Biotech GmbH (DE)

( * ) Notice: Subject to any disclaimer, the term of this patent is extended or adjusted under 35 U.S.C. 154(b) by 1035 days.

(21) Appl. No.: 17/919,001

(22) PCT Filed: Apr. 8, 2021

(86) PCT No.: PCT/EP2021/059191
§ 371 (c)(1),
(2) Date: Oct. 14, 2022

(87) PCT Pub. No.: WO2021/209312
PCT Pub. Date: Oct. 21, 2021

(65) Prior Publication Data
US 2023/0311113 A1 Oct. 5, 2023

(30) Foreign Application Priority Data
Apr. 17, 2020 (EP) .................................... 20170157

(51) Int. Cl.
*B01L 3/00* (2006.01)
*B01F 25/431* (2022.01)

(52) U.S. Cl.
CPC .......... *B01L 3/502* (2013.01); *B01F 25/4316* (2022.01); *B01F 25/431974* (2022.01);
(Continued)

(58) Field of Classification Search
CPC ............... B01L 3/502; B01L 2200/026; B01L 2300/0627; B01L 2300/0832; B01F 25/4316; B01F 25/431974
See application file for complete search history.

(56) References Cited

U.S. PATENT DOCUMENTS 7,973,923 B2 7/2011 Wynn et al.
2010/0269940 A1 10/2010 Wynn et al.
(Continued)

FOREIGN PATENT DOCUMENTS

JP 2021-171054 A 11/2021
WO WO 2014/150832 A2 9/2014

OTHER PUBLICATIONS

Emerson: "Installation & Calibration Equipment Sensor & Instrument Mounting, Accessories, Systems and More," Dec. 31, 2012, accessed via https://www.emerson.com/documents/automation/flyer-installation-calibration-equipment-rosemount-en-71662 on Sep. 24, 2020.
(Continued)

*Primary Examiner* — P. Kathryn Wright
*Assistant Examiner* — Alex Ramirez
(74) *Attorney, Agent, or Firm* — Klarquist Sparkman, LLP

(57) ABSTRACT

A fluid processing system includes a fluid processing unit and a tubing arrangement providing fluid flow to and from the fluid processing unit. The tubing arrangement includes one or more flow cells and the fluid processing unit is selected from a unit comprising a single use tangential flow filtration mobile skid and a unit comprising a device for chromatographic separation. Each one of the flow cells includes a body having an inlet and an outlet and a fluid flow channel extending from the inlet to the outlet of the body.

18 Claims, 8 Drawing Sheets

(52) U.S. Cl.
CPC . *B01L 2200/026* (2013.01); *B01L 2300/0627* (2013.01); *B01L 2300/0832* (2013.01)

(56) References Cited

U.S. PATENT DOCUMENTS

| | | | | |
|---|---|---|---|---|
| 2012/0256641 | A1* | 10/2012 | Andersson | G01N 27/07 324/649 |
| 2015/0323486 | A1* | 11/2015 | Schick | G01N 27/4167 204/403.02 |
| 2016/0327416 | A1* | 11/2016 | Gagne | G01L 19/144 |
| 2020/0003590 | A1 | 1/2020 | Gagne et al. | |
| 2022/0355249 | A1 | 11/2022 | Hodgson | |

OTHER PUBLICATIONS

Extended European Search Report, dated Oct. 7, 2020, issued for European Patent Application No. 20 170 157, 11 pages.
International Search Report and Written Opinion, mailed Jun. 14, 2021, issued for International Patent Application No. PCT/EP2021/059191, 16 pages.
Pall Pall Life Sciences: "Centramate_500S_brochure," PALL, Oct. 31, 2006, accessed via https://shop.pall.com/INTERSHOP/web/WFS/PALL-PALLUS-Site/en_US/-/USD/ViewProductAttachment-OpenFile?UnitName=PALL&LocaleId=en_US&DirectoryPath=pdfs/Biopharmaceu ticals&File Name=USD2448_-_centramate_500S_brochure on Sep. 25, 2020.
"Technical Information Dipfit CPA240 Flow Assembly for pH or ORP sensors," *Endless + Hauser*, Feb. 28, 2019.

* cited by examiner

FLUID PROCESSING SYSTEM

CROSS REFERENCE TO RELATED APPLICATIONS

This is the U.S. National Stage of International Application No. PCT/EP2021/059191, filed Apr. 8, 2021, which was published in English under PCT Article 21(2), which in turn claims the benefit of European Patent Application No. 20 170 157.0, filed Apr. 17, 2020. The prior applications are incorporated herein by reference in their entirety.

TECHNICAL FIELD

The present invention relates to a fluid processing system comprising a fluid processing unit and a tubing arrangement providing fluid flow to and from said fluid processing unit.

BACKGROUND

Fluid processing systems, e.g., bioprocessing systems or filtration systems include a tubing arrangement to provide a fluid flow from a number and/or to a number of containers, e.g., bags or totes, that contain and/or receive a variety of fluids.

There is a continued need in the art to provide solutions to facilitate the setting-up of the tubing arrangement for multiple applications of the fluid processing systems in an efficient manner while providing the necessary functionality for controlling of the processing of the fluids.

SUMMARY OF THE INVENTION

The present invention provides for a fluid processing system comprising a fluid processing unit and a tubing arrangement providing fluid flow to and from said fluid processing unit. In order to cope with the challenge to provide the functionality necessary for controlling the processing of the fluids said tubing arrangement is provided with one or more flow cells, each of said flow cells comprising a body having an inlet and an outlet and a fluid flow channel extending from the inlet to the outlet of the body. The body of the flow cells further comprises a receptacle comprising a chamber forming a part of the fluid flow channel of the body. Said chamber comprises a first opening for connecting a functional element to the flow cells such that the functional element is in contact with or exposed to a fluid flow passing through the fluid flow channel. The flow cell(s) further comprise a first tubular connector arranged adjacent to the inlet of the body and a second tubular connector arranged adjacent to the outlet of the body. The flow cell(s) of the system according to the present invention furthermore comprise a fluid flow path extending from the first tubular connector through the inlet of the body, the body and its receptacle to the outlet of the body to the second tubular connector. The fluid processing unit of the inventive fluid processing system is selected from a unit comprising a single use tangential flow filtration mobile skid and a unit comprising a device for chromatographic separation.

Thus, the present invention provides for a system, which may be easily adapted to various challenges in a broad variety of applications, especially by allowing accommodation a broad variety of functional elements in the flow cell(s).

DETAILED DESCRIPTION OF THE INVENTION

Preferably, the flow cells incorporated into the tubing arrangement of the systems according to the present invention provide for a fluid flow path having a predetermined, essentially consistent cross-sectional area at least within and along the first and second tubular connectors, and more preferably, the cross sectional area of the fluid flow path along the flow channel corresponds essentially to the cross-sectional area in the first and second tubular connectors.

In a preferred embodiment, the volume of the chamber of the body of the flow cell(s) is designed to provide a cross-sectional area of the fluid flow path equal to or larger than the cross-sectional area of the fluid flow path within and along the first and second tubular connectors, preferably also once the functional element is connected to the opening and optionally extends into the chamber.

Thus, the flow cell incorporated into a system to the present invention provides for an unobstructed fluid flow through the flow cell independent of the type of functional element connected to the opening of the chamber.

In many embodiments the tubular connectors of the flow cell are directly attached to the body, more preferably said tubular connectors are formed integrally with the body.

According to a preferred embodiment, the body and/or the tubular connectors of the fluid flow cell are made of a plastics material, said plastics material being preferably selected from polycarbonate, polypropylene, polysulfone, polyethersulfone, polybutylene terephthalate, polyethylene terephthalate, polyetherether ketone, polyetherimide, low density polyethylene, high density polyethylene, and silicone (polysiloxane). Alternatively, the body and/or the tubular connectors of the flow cell may be made from metal, especially stainless steel.

According to one embodiment of the flow cell, the fluid flow channel has a straight configuration. Consequently, the first and the second tubular connectors are arranged at opposite portions of the chamber extending away from one another.

According to another embodiment, the flow cell comprises a fluid flow channel that is of a curved or arcuate configuration, an angled configuration, preferably a 90 degree angled configuration, or a T-shaped configuration.

Thus, the various embodiments of the flow cell having different configurations may be used and adapted to the different configurations of the systems according to the present invention as required by specific challenges.

According to a preferred embodiment, the chamber of the receptacle of the flow cell has a second opening opposite the first opening, said second opening optionally providing either the inlet or the outlet of the body.

In many embodiments the flow cell incorporates a receptacle having a chamber which is essentially of a hollow cylindrical shape.

According to a further preferred embodiment of the present invention, the first opening of the chamber comprises a circular projection extending away from said body to sealingly receive the functional element.

Thus, a simple configuration of the flow cell and its functional element depending on the need of a specific process and/or processing system may be obtained.

Furthermore, the first opening of the chamber may accommodate an adapter for positioning a probe end of the functional element in a predefined position, e.g., within the chamber. Thus, the functional element may be precisely positioned so as to reliably ensure the function of said functional element.

The functional elements that may be used for an inventive system may be selected from a broad variety of functional elements as already stated above.

Preferred types of functional elements are a static mixer, a conductivity sensor, a pH sensor, a pressure sensor, an electrical grounding element, a redox sensing element, a temperature sensor, a capacitive sensor, an optical sensor, e.g., a UV sensor, a flow sensor, and an element for taking liquid samples.

In case the functional element is selected from a conductivity sensor and a pH sensor, preferably a probe end of the sensor extending into the chamber of the flow cell is positioned such that it keeps a distance to all wall parts of the chamber of about 12 mm or more, preferably of about 15 mm or more. Furthermore, it is preferable that all the dimensions of the chamber perpendicular to the direction the sensor with its probe end extends into the chamber is about 25 mm or more, more preferably about 28 mm or more, and in particular about 70 mm or less, preferably about 50 mm or less. In case the chamber is of a hollow cylindrical shape such dimension corresponds to the inner diameter of the chamber. Typically, the diameter of a probe end of such sensors is about 12 mm.

Further and alternative aspects and features of the disclosed principles will be appreciated from the following detailed description and the accompanying drawings. As will be appreciated, the flow cells disclosed herein are capable of being used in other and different environments, and are capable of being modified in various respects. Accordingly, it is to be understood that both the foregoing general description and the following detailed description are merely exemplary and explanatory and do not restrict the scope of the appended claims.

DETAILED DESCRIPTION OF THE DRAWINGS

Figure 1:
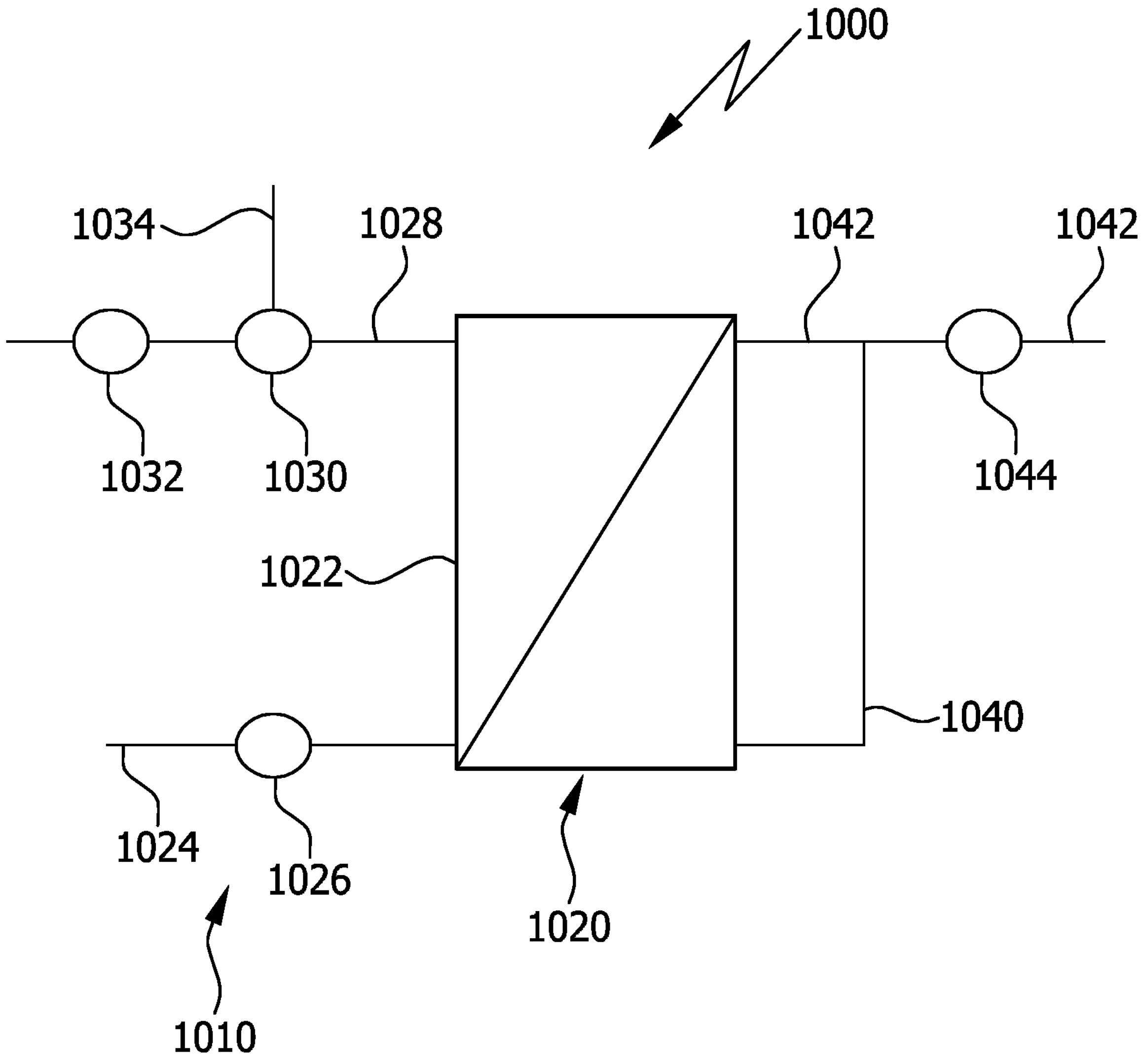
FIG. 1 shows a first embodiment of a fluid processing system according to the present invention in a schematic representation.

FIG. 1 shows a first embodiment of an inventive fluid processing system 1000 in a schematic representation. The system 1000 is designed as a single use tangential flow filtration mobile skid.

The system 1000 comprises a tubing arrangement 1010 providing fluid flow to and from a processing unit 1020 which comprises a tangential flow filtration device 1022.

The tubing arrangement 1010 comprises a feed line 1024 incorporating a flow cell 1026 which may accommodate a functional element, in particular a pressure sensor (not shown in detail).

The tubing arrangement furthermore includes a retentate line 1028 which may form together with the feed line 1024 and further devices (not shown) a recirculation loop.

In order to properly control the function of the recirculation loop the retentate line 1028 incorporates a flow cells 1030. The flow cell 1030 may incorporate a pressure sensor (not shown in detail) and in addition provide access to a vent (not shown) via a line 1034. The retentate line 1208 further incorporates one or more flow cells 1032 accommodating a functional element (not shown in detail), in particular selected from an electrical grounding element, a pH sensor, a conductivity sensor, a flow sensor, a pressure sensor, and a temperature sensor.

The tubing arrangement 1010 further provides on the downstream side of the processing unit 1020 two filtrate lines 1040, 1042. Filtrate line 1042 incorporates one or more flow cells 1044 accommodating a functional element (not shown in detail), in particular in the form of a pressure sensor, a pH sensor, a UV sensor, a conductivity sensor, and an electrical grounding element.

Figure 2:
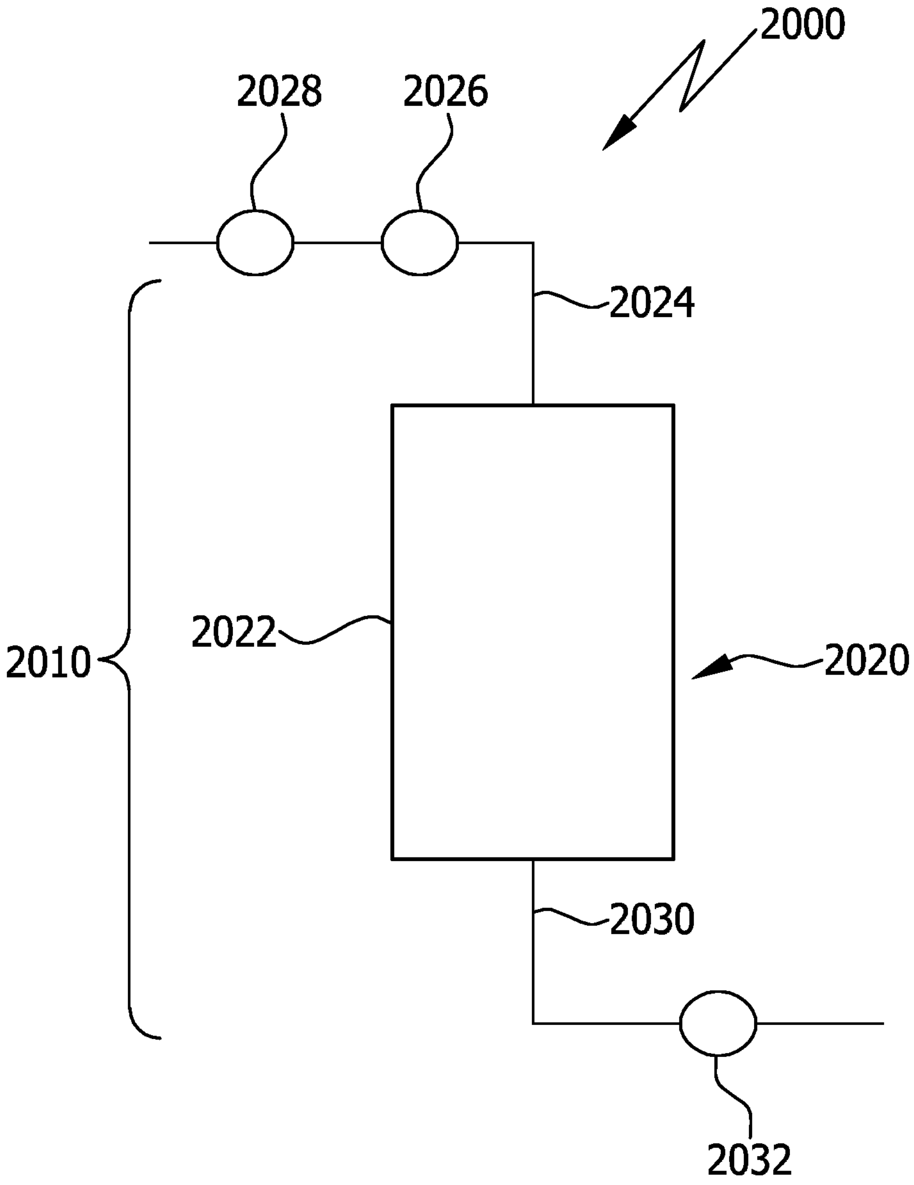
FIG. 2 shows a further embodiment of a fluid processing system according to the present invention in a schematic representation.

FIG. 2 shows a second embodiment of an inventive fluid processing system 2000 in a schematic representation. The system 2000 is designed as a system for chromatographic separation.

The system 2000 comprises a tubing arrangement 2010 providing fluid flow to and from a processing unit 2020 which comprises a chromatography column 2022.

The tubing arrangement 2010 comprises a feed line 2024 incorporating two or more flow cells 2026, 2028, each of which accommodating a functional element (not shown in detail), in particular selected from a static mixer, a pH sensor, a conductivity sensor, a flow sensor, a pressure sensor, and a temperature sensor.

Downstream of the chromatography column 2022 a drainage line 2030 receives treated fluid from the column 2022 for storage or further processing. The drainage line 2030 may also incorporate one or more flow cells 2032 accommodating a functional element (not shown in detail), in particular a conductivity sensor, a pH sensor, a temperature sensor, a pressure sensor, a UV sensor, and an electrical grounding element.

While the flow cells incorporated in the tubing arrangements of the inventive systems 1000 and 2000 of FIGS. 1 and 2 have not been shown and described so far in detail, the following description of the FIGS. 3 to 8 will provide for such a detailed structure and a description of the functionality of a plurality of flow cells and the functional elements incorporated therein.

Figure 3:
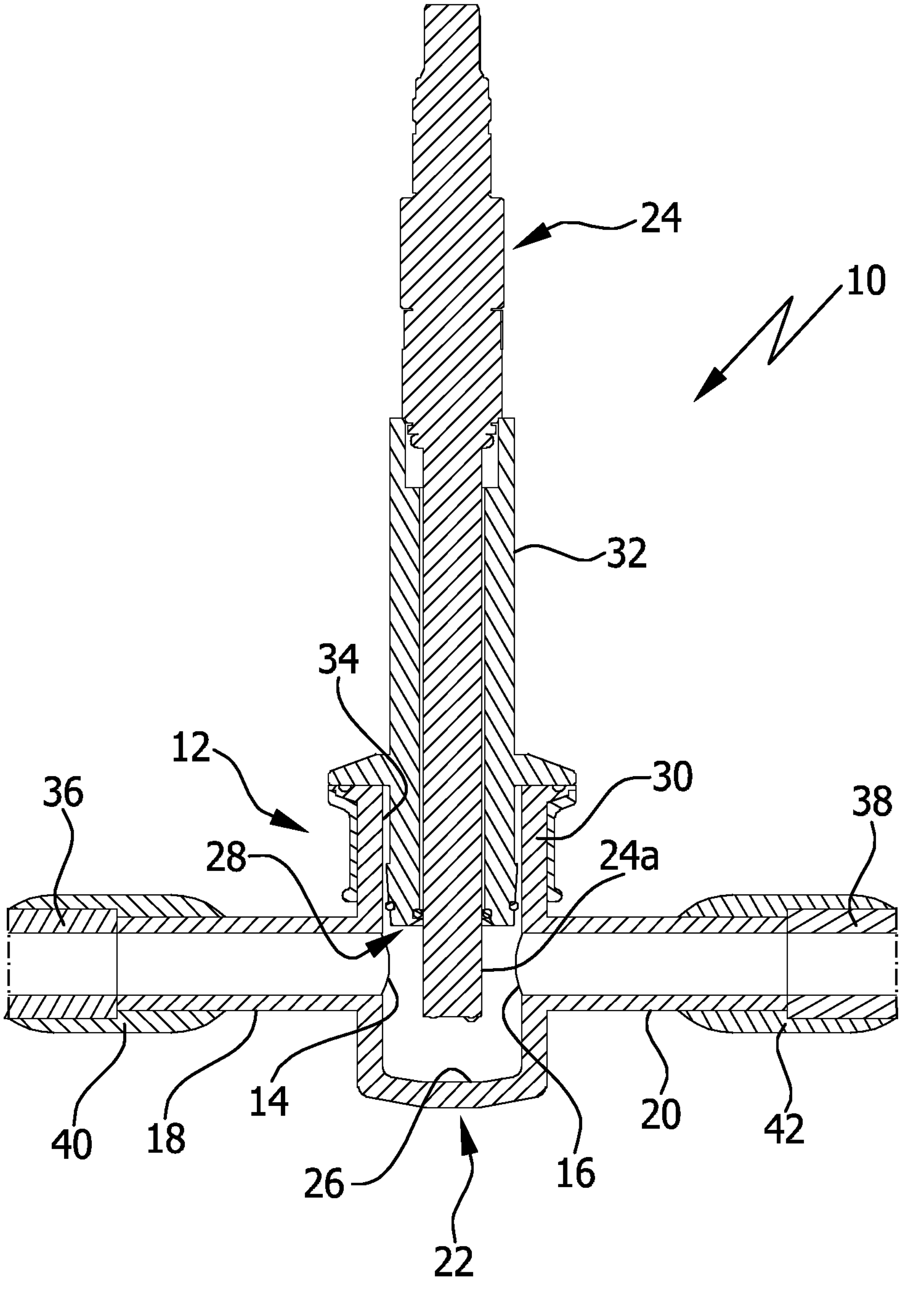
FIG. 3 shows an embodiment of a flow cell to be used in a fluid processing system according to the present invention.

FIG. 3 shows a first embodiment of a flow cell 10 comprising a body 12 having an inlet 14 and an outlet 16 and a fluid flow channel extending from the inlet 14 to the outlet 16 of the body 12. The inlet 14 and the outlet 16 are arranged at opposite portions of the body, and the fluid flow channel extends in a straight configuration from the inlet 14 to the outlet 16.

The flow cell 10 further comprises a first tubular connector 18 and a second tubular connector 20 arranged adjacent to the inlet 14 and the outlet 16, respectively.

The body 12 of the flow cell 10 further comprises a receptacle 22 with a chamber 26 of an essentially hollow cylindrical shape for accommodating a functional element 24, said chamber 26 forming a part of the fluid flow channel of the body 12. The chamber 26 comprises at one end of the hollow cylindrical shape a first opening 28 providing an access for the functional element 24 to the chamber 26. The first opening 28 of the chamber 26 comprises a circular projection 30 extending away from the body 12 in a direction perpendicular to the flow channel of the body 12.

In the embodiment of FIG. 3 the body 12, the first and second tubular connectors 18, 20, the receptacle 22 as well as the circular projection 30 are preferably formed, in particular moulded, as one integral part, e.g., from a silicone material.

The functional element 24 may be a conductivity sensor probe and is mounted in the circular projection 30 of the receptacle 22 via a sensor probe support 32. The sensor probe support 32 extends into the circular projection 30 and sealingly accommodates the conductivity sensor probe 24 such that a sensor probe end 24*a* is positioned within the volume of the chamber 26 and is exposed to the fluid flow passing through the fluid flow channel of the flow cell 10. The volume of the chamber 26 is preferably configured such that the cross-section of the flow channel within the chamber 26 is essentially consistent with the cross-section of the flow channel in the remainder of the flow cell 10 also once the conductivity sensor probe 24 is mounted in the circular projection 30 and its probe end 24*a* extends into the chamber 26.

Furthermore, it is preferable to design the chamber 26 and the adapter 32 such that the probe end 24*a* of the conductivity sensor 24 keeps a predefined distance to all wall parts of the chamber 26, more preferably such that the sensing electrodes at the probe end 24*a* of the conductivity sensor 24 are spaced apart from the wall parts of the chamber 26 by 12 mm or more, most preferably 15 mm or more. Based on the typical dimensions of the conductivity sensor 24—the diameter of the probe end is typically about 12 mm—an inner diameter of the hollow cylindrical chamber 26 is preferably about 28 mm to about 50 mm.

The sensor probe support 32 sealingly abuts an inner surface 34 of the circular projection 30 such that the fluid flow channel is sealed off against the environment of the flow cell 10.

The flow cell 10 of the present invention may be sealingly connected to a tubing arrangement (here represented by tube endings 36, 38) via the first and second tubular connectors 18, 20 by pipe couplings 40, 42. The pipe couplings 40, 42 may be formed by overmolding the free ends of the tubular connectors 18, 20 and the tube endings 36, 38, respectively.

Figure 4:
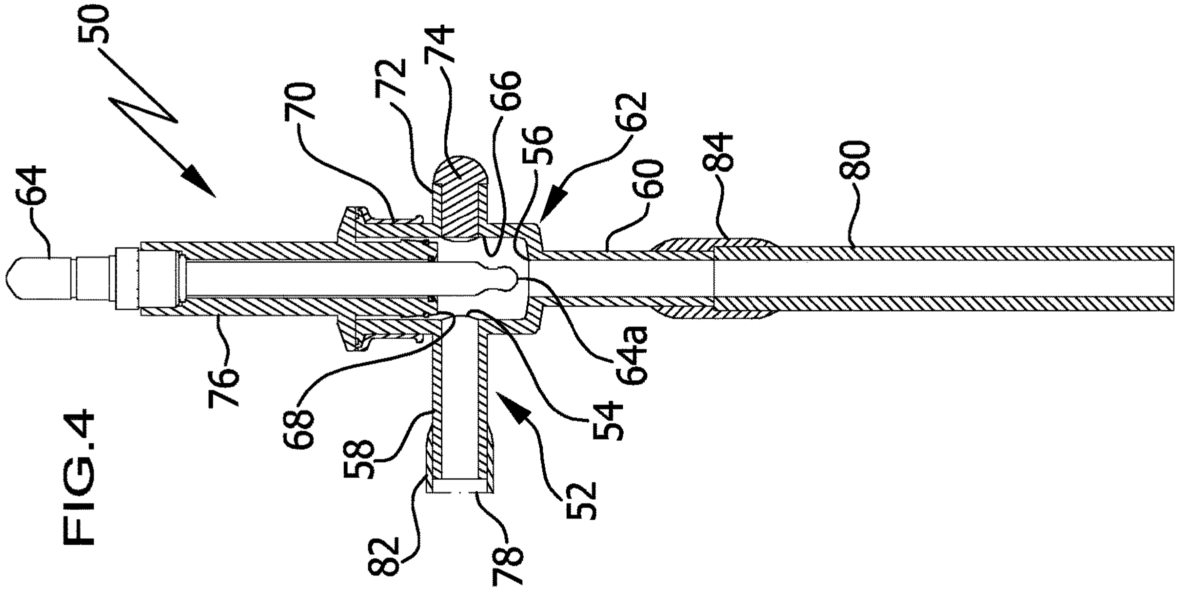
FIG. 4 shows a further embodiment of a flow cell to be used in a fluid processing system according to the present invention.

FIG. 4 shows a further embodiment of a flow cell 50 according to the present invention comprising a body 52 having an inlet 54 and an outlet 56 and a fluid flow channel extending from the inlet 54 to the outlet 56 of the body 52. The body 52 of the flow cell 50 comprises a receptacle 62 for accommodating a functional element 64, which may be a pH sensor probe.

The inventive flow cell 50 further comprises a first tubular connector 58 and a second tubular connector 60 arranged adjacent to the inlet 54 and the outlet 56, respectively.

The receptacle 62 comprises a chamber 66 of an essentially hollow cylindrical shape for accommodating the functional element, i.e., the pH sensor probe 64. The chamber 66 forms a part of the fluid flow channel of the body 52. The chamber 66 comprises at one end of the hollow cylindrical shape a first opening 68 providing an access for the functional element 64 to the chamber 66. The first opening 68 of the chamber 66 comprises a circular projection 70 extending away from the body 52. In contrast to the embodiment shown in FIG. 3, the chamber 66 of the body 52 of the flow cell 50 comprises a second opening at the opposite end of the cylindrical shape, which serves as the outlet 56 of the body 52. Thus, the fluid flow channel of the body 52 is angled at 90 degrees.

In the embodiment of FIG. 4 the body 52, the first and second tubular connectors 58, 60, the receptacle 62 as well as the circular projection 70 are preferably formed, in particular moulded, as one integral part, e.g., from a silicone material.

The body 52 may have a further tubular connector 72 extending from the body 58 and its receptacle 62 in a direction opposite to the first tubular connector 58. While this tubular connector 72 may also serve to provide a further fluid flow into or from the chamber 66, it is closed by a plug 74 in the embodiment shown in FIG. 4.

The pH sensor probe 64 is mounted in the circular projection 70 of the opening 68 via a sensor probe support or holder 76. The sensor probe holder 76 extends into the circular projection 70 and sealingly accommodates the pH sensor probe 64 such that a sensor probe end 64*a* is positioned within the volume of the chamber 66 and is directly exposed to the fluid flow passing through the fluid flow channel of the flow cell 50. The volume of the chamber 66 is preferably configured such that the cross-section of the flow channel within the chamber 66 is essentially consistent with the cross-section of the flow channel in the remainder of the flow cell 50, also once the pH sensor probe 64 is mounted in the circular projection 70 and its end 64*a* extends into the chamber 66.

The sensor probe holder 76 sealingly abuts an inner surface of the circular projection 70 such that the fluid flow channel is completely sealed off against the environment of the flow cell 50.

The flow cell 50 of the present invention may be sealingly connected to a tubing arrangement (here represented by tube endings 78, 80) via the first and second tubular connectors 58, 60 by pipe couplings 82, 84. The pipe couplings 82, 84 may be formed by overmolding the free ends of the tubular connectors 58, 60 and the tube endings 78, 80, respectively.

Figure 5:
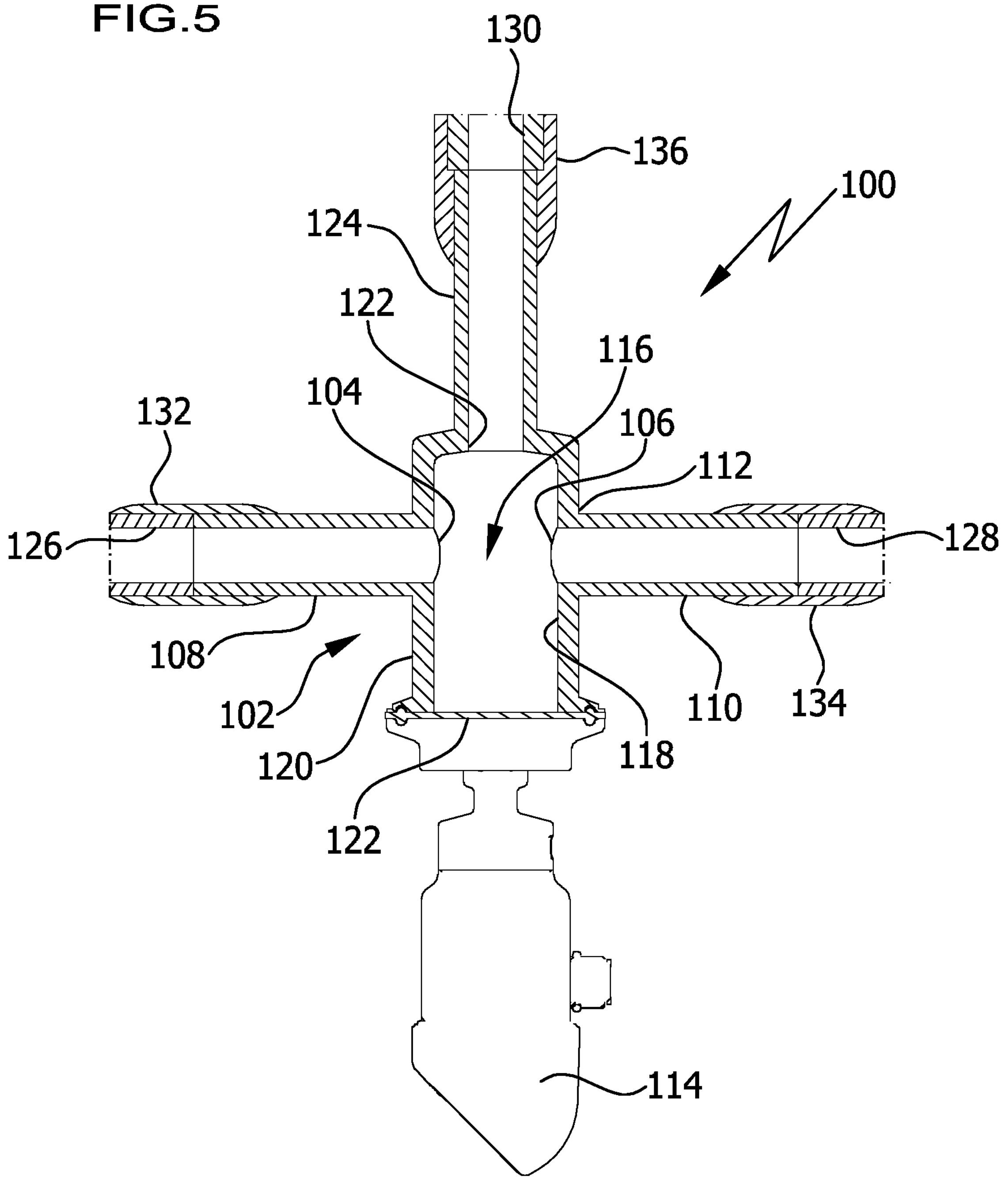
FIG. 5 shows a further embodiment of a flow cell to be used in a fluid processing system according to the present invention.

FIG. 5 shows another embodiment of an inventive flow cell 100 comprising a body 102 having an inlet 104 and an outlet 106 and a fluid flow channel extending from the inlet 104 to the outlet 106 of the body 102. The inlet 104 and the outlet 106 are arranged at opposite portions of the body 102, and the fluid flow channel extends in a straight configuration from the inlet 104 to the outlet 106.

The inventive flow cell 100 further comprises a first tubular connector 108 and a second tubular connector 110 arranged adjacent to the inlet 104 and the outlet 106, respectively.

The body 102 of the flow cell 100 further comprises a receptacle 112 with a chamber 116 of an essentially hollow cylindrical shape, said chamber 116 forming a part of the fluid flow channel of the body 102. The chamber 116 comprises at one end of the hollow cylindrical shape a first opening 118 for connecting a functional element 114 to the chamber 116. The first opening 118 of the chamber 116 comprises a circular projection 120 extending away from the body 102 in a direction perpendicular to the flow channel of the body 102. The functional element 114 in FIG. 5 is designed as a pressure sensor. The pressure sensor 114 may be in direct contact with the fluid passing through the flow path of the flow cell 100 or, as it is shown in FIG. 5, in indirect contact via a closure element 122. The closure element 122 is designed such as to transmit the pressure within the flow cell 100 and may form a part of the pressure sensor 114 or be designed as a separate part or adapter to be mounted on the flow cell 100, i.e., its opening 118 and the circular projection 120, respectively.

So far, the structure of the flow cell 100 corresponds essentially to the structure of the flow cell 10 shown in FIG. 3. However, the chamber 116 of the receptacle 112 of the flow cell 100 is provided with a second opening 122 located at an end of the hollow cylindrical shape of the chamber 116 opposite to the one end accommodating the first opening 118. The opening 122 connects to a third tubular connector 124. Thus, the flow cell 100 may provide for an additional functionality as compared to the flow cell 10 of FIG. 3.

In the embodiment of FIG. 5, the body 102, the first, second and third tubular connectors 108, 110, 124, the receptacle 112 as well as the circular projection 120 are preferably formed, in particular molded, as one integral part, e.g., from a silicone material.

The flow cell 100 of the present invention may be sealingly connected to a tubing arrangement (here represented by tube endings 126, 128, 130) via the first, second and third tubular connectors 108, 110, 124 by pipe couplings 132, 134, 136. This embodiment of a flow cell is one example for a flow cell having a T-shaped flow channel configuration. The pipe couplings 132, 134, 136 may be formed by overmolding the free ends of the tubular connectors 108, 110, 124 and the tube endings 126, 128, 130, respectively.

Figure 6:
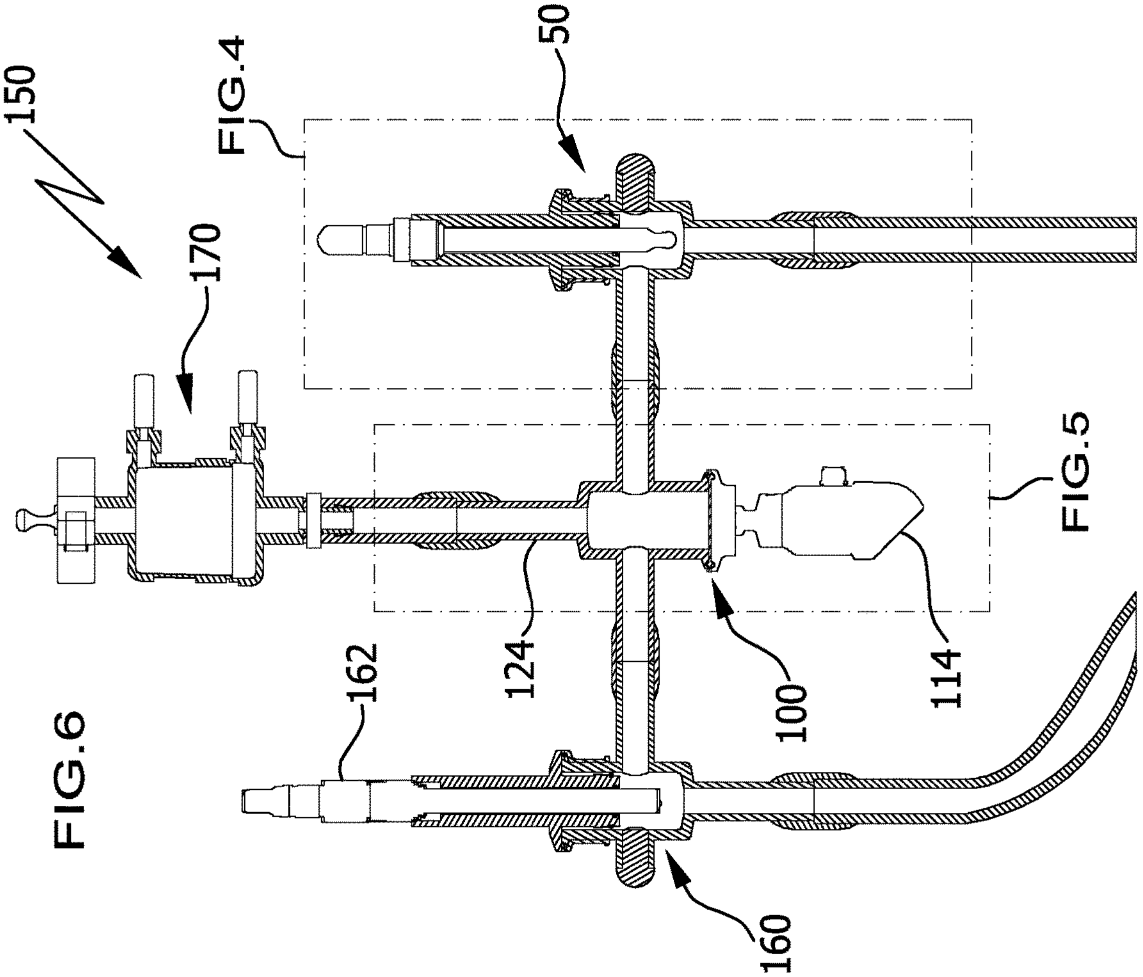
FIG. 6 shows a part of a tubing arrangement of a fluid processing system of the present invention incorporating multiple flow cells.

FIG. 6 shows a cross section of a part of a tubing arrangement 150 of a fluid processing system according to the present invention. On the right hand side, the tubing arrangement 150 incorporates the flow cell 50 of FIG. 4. On the left, the tubing arrangement 150 connects to a flow cell 160, which essentially corresponds in its structure to the flow cell 50. However, the functional element accommodated in the flow cell 160 is a conductivity sensor probe 162.

Furthermore, the tubing arrangement 150 shown in FIG. 6 comprises a further inventive flow cell 100 accommodating a pressure sensor 114 as a functional element. The flow cell 100 has already been described in more detail above in connection with FIG. 3.

The flow cell 100 furthermore provides for the possibility to connect an air filter 170 to the tubing arrangement 150 for venting integrity testing of the arrangement 150.

From FIG. 6 it is readily apparent how the flow cells of the systems of the present invention allow a set-up of multi-functional control and/or processing means with minimum tubing and footprint. In this embodiment, the flow cells are directly connected to one another (serialized) by overmolding their abutting tubular connectors.

FIGS. 7A to 7D show two further embodiments of a flow cell of a system according to the present invention.

Figure 7A:
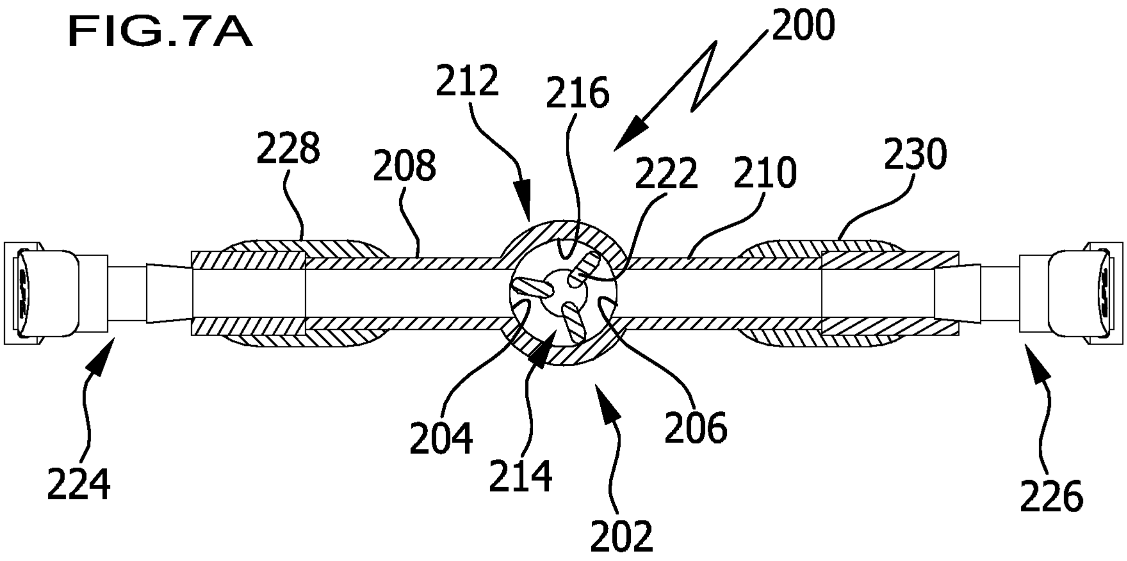
FIGS. 7A, 7B, 7C and 7D show two further embodiments of a flow cell to be used in a fluid processing system according to the present invention in different perspectives.
Figure 7D:
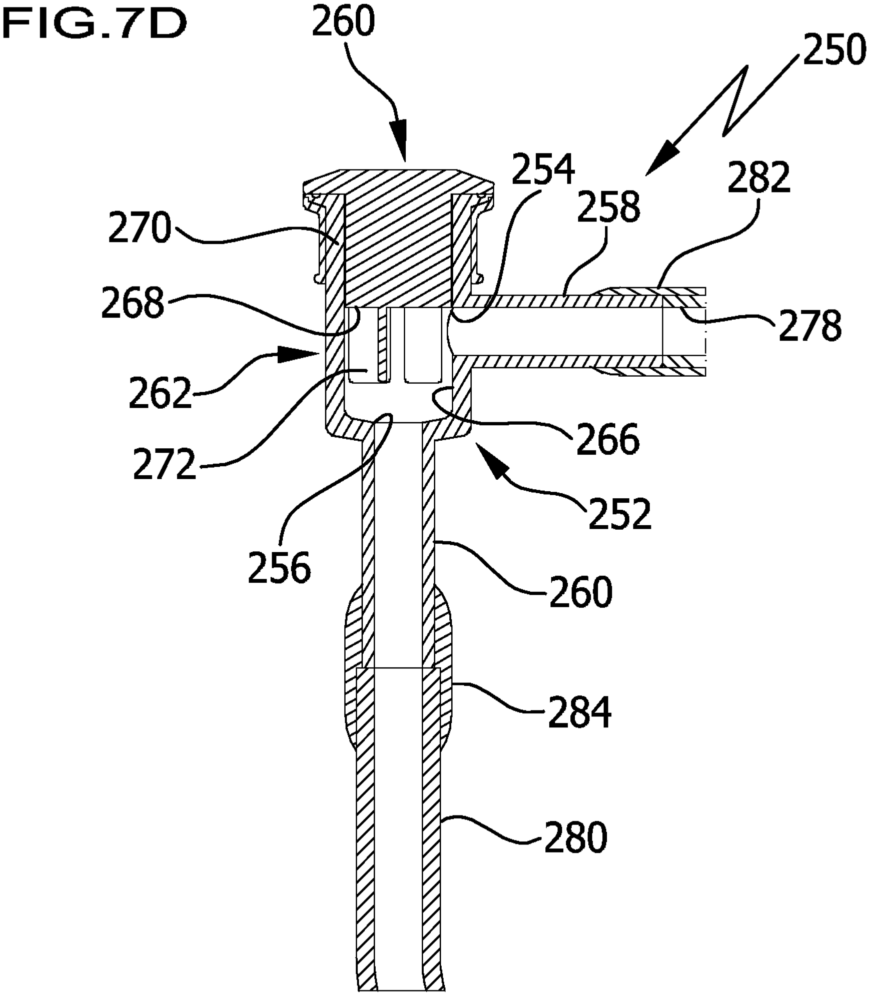
Figure 7B:
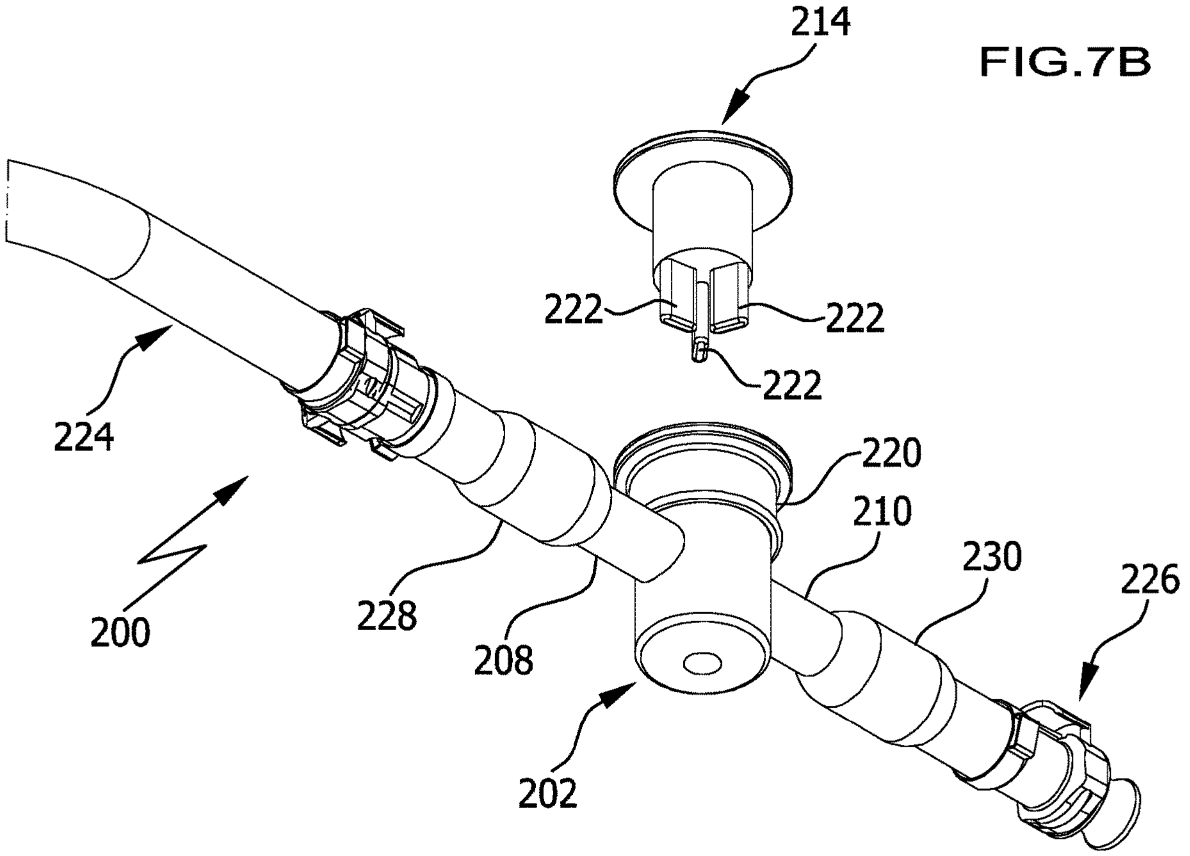
Figure 7C:
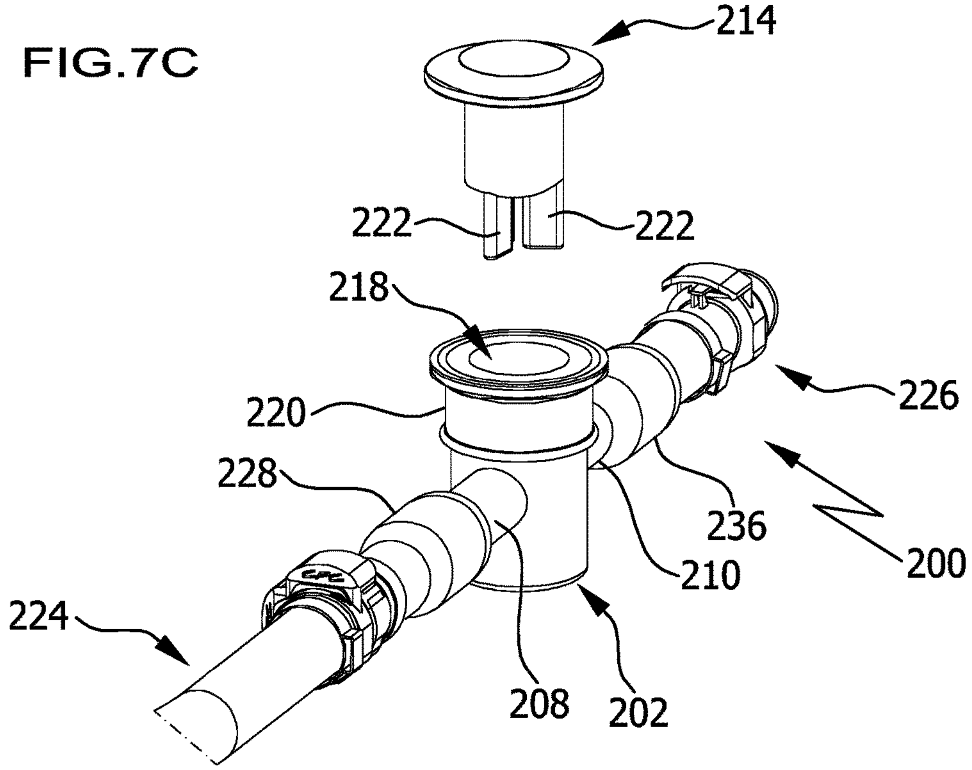

FIGS. 7A to 7C show a flow cell 200 in a cross-sectional and two different perspective views, respectively.

FIG. 7A shows a cross-sectional view of the flow cell 200 comprising a body 202 having an inlet 204 and an outlet 206 and a fluid flow channel extending from the inlet 204 to the outlet 206 of the body 202. The inlet 204 and the outlet 206 are arranged at opposite portions of the body 202, and the fluid flow channels extends in a straight configuration from the inlet 204 to the outlet 206.

The flow cell 200 further comprises a first tubular connector 208 and a second tubular connector 210 arranged adjacent to the inlet 204 and the outlet 206, respectively.

The body 202 of the flow cell 200 further comprises a receptacle 212 with a chamber 216 of an essentially hollow cylindrical shape for accommodating a functional element 214, here in the form of a static mixing element.

Again, the chamber 216 forms a part of the fluid flow channel of the body 202. The chamber 216 comprises at one end of the hollow cylindrical shape a first opening 218 providing an access for the static mixing element 214 to the chamber 216. The first opening 218 of the chamber 26 comprises a circular projection 220 extending away from the body 202 in a direction perpendicular to the flow channel of the body 202. The static mixer 214 is sealingly mounted in the circular projection 220 of the receptacle 212. The static mixer 214 comprises three mixing fins 222 projecting into the chamber 216 thereby effecting a turbulent fluid flow resulting in a thorough mixing of the components of a fluid passing through the flow cell 200.

In the embodiment of FIGS. 7A to 7C the body 202, the first and second tubular connectors 208, 210, the receptacle 212 as well as the circular projection 220 are formed, in particular molded, as one integral part, e.g., from a silicone material.

The volume of the chamber 216 is preferably configured such that the cross-section of the flow channel within the chamber 216 is essentially consistent with the cross-section of the flow channel in the remainder of the flow cell 200 or larger also once the static mixer 214 is mounted in the circular projection 220 and its fins 222 extend into the chamber 216.

The flow cell 200 may be sealingly connected to a, e.g., flexible tubing arrangement (here represented by tube endings 224, 226) via the first and second tubular connectors 208, 210 by pipe couplings 228, 230. The pipe couplings 228, 230 may be formed by overmolding the free ends of the tubular connectors 208, 210 and the tube endings 224, 226, respectively.

FIG. 7D shows a variant of the flow cell 200 in the form of a flow cell 250, wherein the fluid flow channel is of a 90 degree angled configuration instead of a straight configuration as in flow cell 200.

The flow cell 250 comprises a body 252 having an inlet 254 and an outlet 256 and a fluid flow channel extending from the inlet 254 to the outlet 256 of the body 252. The body 252 of the flow cell 250 comprises a receptacle 262 providing a chamber 266 for accommodating a functional element 264, which may be static mixer.

The flow cell 250 further comprises a first tubular connector 258 and a second tubular connector 260 arranged adjacent to the inlet 254 and the outlet 256, respectively.

The chamber 266 of the receptacle 262 has an essentially hollow cylindrical shape for accommodating the functional element, such as the static mixer 264. The chamber 266 forms a part of the fluid flow channel of the body 252. The chamber 266 comprises at one end of the hollow cylindrical shape a first opening 268 providing an access for the static mixer 264 to the chamber 266. The receptacle 262 comprises at the first opening 268 of the chamber 266 a circular projection 270 extending away from the body 252.

In contrast to the embodiment shown in FIGS. 7A to 7C the chamber 266 of the body 252 of the flow cell 250 comprises a second opening at the opposite end of the cylindrical shape, which serves as the outlet 256 of the body 252. Thus, the fluid flow channel of the body 252 is angled at 90 degrees.

In the embodiment of FIG. 7D, the body 252, the first and second tubular connectors 258, 260, the receptacle 262 as well as the circular projection 270 are preferably formed, in particular moulded, as one integral part, e.g., from a silicone material.

The static mixer 264 is sealingly mounted in the circular projection 270 of the opening 268, and its mixing fins 272 extend into the chamber 266. Thus, the fins 272 are exposed to the fluid flow passing through the fluid flow channel of the flow cell 250 and provide for a thorough mixing of the components of the fluid passing through the flow cell 250. The volume of the chamber 266 is preferably configured such that the cross-section of the flow channel within the chamber 266 is essentially consistent with or larger than the cross-section of the flow channel in the remainder of the flow cell 250, also once the static mixer 264 is mounted in the circular projection 720 and its fins 272 extend into the chamber 266.

The flow cell 250 may be sealingly connected to a tubing arrangement (here represented by tube endings 278, 280) via the first and second tubular connectors 258, 260 by pipe couplings 282, 284. The pipe couplings 282, 284 may be formed by overmolding the free ends of the tubular connectors 258, 260 and the tube endings 278, 280, respectively.

Figure 8:
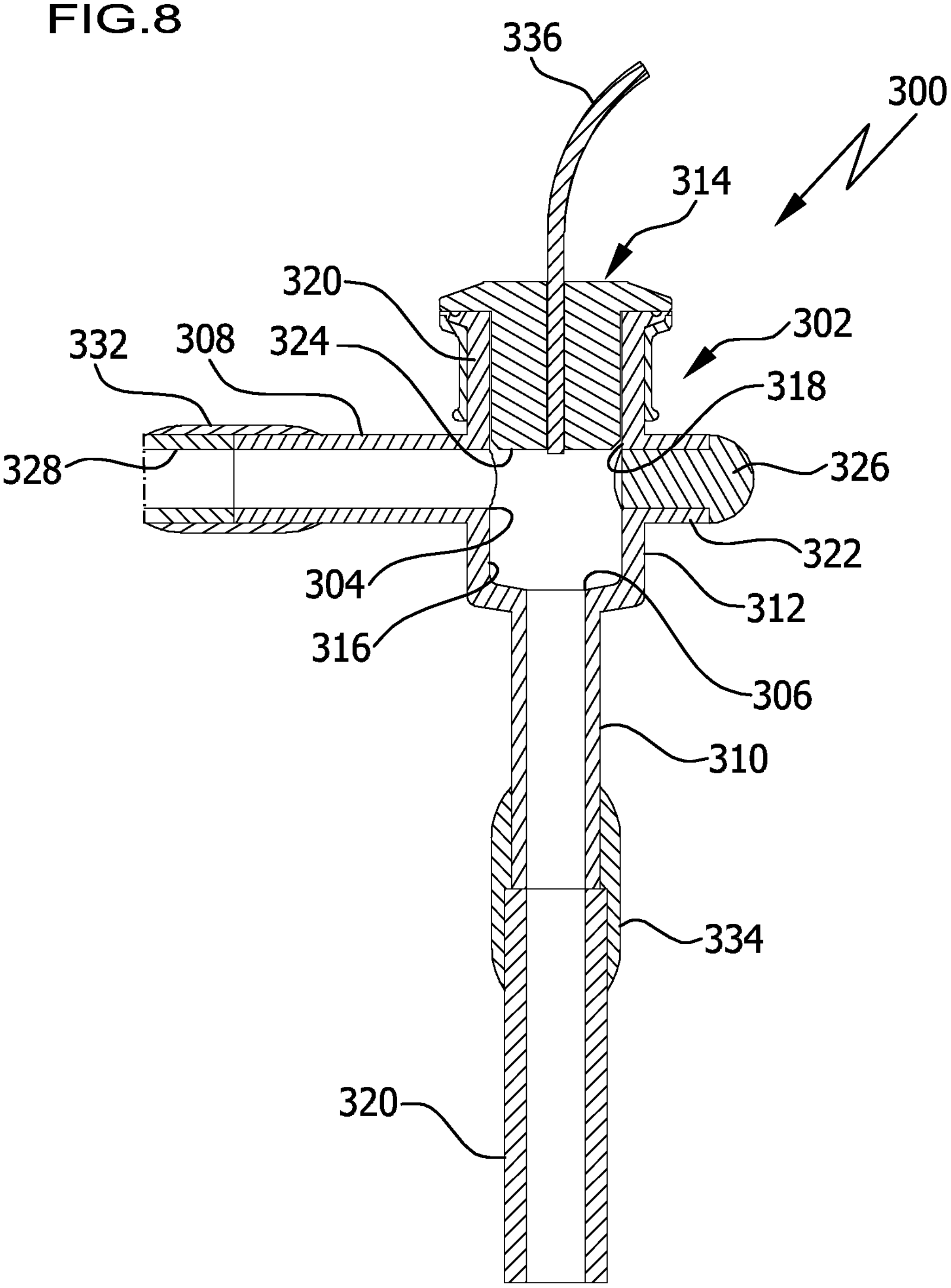
FIG. 8 shows a further embodiment of a flow cell to be used in a fluid processing system according to the present invention.

FIG. 8 shows a further embodiment of a flow cell 300 according to the present invention comprising a body 302 having an inlet 304 and an outlet 306 and a fluid flow channel extending from the inlet 304 to the outlet 306 of the body 302. The body 302 of the flow cell 300 comprises a receptacle 312 for accommodating a functional element 314, which may be an electrical grounding element.

The flow cell 300 further comprises a first tubular connector 308 and a second tubular connector 310 arranged adjacent to the inlet 304 and the outlet 306, respectively.

The receptacle 312 comprises a chamber 316 of an essentially hollow cylindrical shape for accommodating the functional element, such as the electrical grounding element 314. The chamber 316 forms a part of the fluid flow channel of the body 302. The chamber 316 comprises at one end of the hollow cylindrical shape a first opening 318 providing an access for the functional element 314 to the chamber 316. The first opening 318 of the chamber 316 comprises a circular projection 320 extending away from the body 302. The electrical grounding element 314 is sealingly mounted in said circular projection 320.

The chamber 316 of the body 302 of the flow cell 300 comprises a second opening at the opposite end of the cylindrical shape, which serves as the outlet 306 of the body 302. Thus, the fluid flow channel of the body 302 is angled at 90 degrees.

In the embodiment of FIG. 8 the body 302, the first and second tubular connectors 308, 310, the receptacle 312 as well as the circular projection 320 are preferably formed, in particular moulded, as one integral part, e.g., from a silicone material.

The body 302 may have a further tubular connector 322 extending from the body 302 and its receptacle 312 in a direction opposite to the first tubular connector 308. While this tubular connector 322 may also serve to provide a further fluid flow into or from the chamber 316, it is closed by a plug 326 in the embodiment shown in FIG. 8.

The electrical grounding element 314 is mounted in the circular projection 320 of the opening 318 such as to abut with its lower surface 324 the volume of the chamber 316. An earthing wire 336 of the electrical grounding element 314 extends through the electrical grounding element 314 down to the lower surface 324 and is in direct contact with the fluid flow directed through the flow cell 300.

The volume of the chamber 316 is preferably configured such that the cross-section of the flow channel within the chamber 326 is larger than the cross-section of the flow channel in the remainder of the flow cell 300.

The flow cell 300 may be sealingly connected to a tubing arrangement (here represented by tube endings 328, 330) via the first and second tubular connectors 308, 310 by pipe couplings 332, 334. The pipe couplings 332, 334 may be formed by overmolding the free ends of the tubular connectors 308, 310 and the tube endings 328, 330, respectively.

All references, including publications, patent applications, and patents, cited herein are hereby incorporated by reference to the same extent as if each reference were individually and specifically indicated to be incorporated by reference and were set forth in its entirety herein describing the invention (especially in the context of the following claims) and are to be construed to cover both the singular and the plural, unless otherwise indicated herein or clearly contradicted by context.

The terms “comprising”, “having”, “including”, and “containing” are to be construed as open-ended terms (i.e., meaning “including, but not limited to”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fluid processing system comprising a fluid processing unit and a tubing arrangement providing fluid flow to and from said fluid processing unit, wherein said tubing arrangement comprises one or more flow cells, each one of said one or more flow cells comprising:

a functional element;

a body having an inlet and an outlet and a fluid flow channel extending from the inlet to the outlet of the body, said body further comprising a receptacle comprising a chamber forming a part of the fluid flow channel of the body, said chamber comprising a first opening for connecting the functional element to said one or more flow cells such that the functional element is in contact with or exposed to a fluid flow passing through the fluid flow channel;

a first tubular connector arranged adjacent to the inlet of the body;

a second tubular connector arranged adjacent to the outlet of the body; and a fluid flow path extending from the first tubular connector through the inlet of the body, the body and its receptacle to the outlet of the body to the second tubular connector; and wherein said fluid processing unit is selected from a unit comprising a single use tangential flow filtration mobile skid and a unit comprising a device for chromatographic separation, wherein said fluid flow path of the flow cell has a predetermined, consistent cross-sectional area at least within and along the first and second tubular connectors, and wherein the volume of the chamber of the body of the flow cell is configured to provide a cross-sectional area of the fluid flow path equal to or larger than the cross-sectional area of the fluid flow path within and along the first and second tubular connectors, including when the functional element is connected to the first opening and extends into the chamber.

2. The system according to claim 1, wherein said tubular connectors of the flow cell are directly attached to the body.

3. The system according to claim 1, wherein said body and/or said tubular connectors of the flow cell are made of metal or a plastics material.

4. The system according to claim 1, wherein the fluid flow channel of the body of the flow cell has a straight configuration.

5. The system according to claim 1, wherein the fluid flow channel of the body of the flow cell is of an arcuate or curved configuration, an angled configuration, or a T-shaped configuration.

6. The system according to claim 1, wherein the chamber of the receptacle of the body of the flow cell has a second opening opposite to the first opening, said second opening providing one of the inlet and outlet of the body.

7. The system according to claim 1, wherein the chamber of the receptacle of the body of the flow cell has an essentially hollow cylindrical shape.

8. The system according to claim 1, wherein the first opening of the chamber of the body of the flow cell comprises a circular projection extending away from said body to receive said functional element.

9. The system according to claim 1, wherein said first opening of the chamber of the body of the flow cell accommodates an adapter for positioning one end of the functional element in a predefined position.

10. The system according to claim 1, wherein said functional element is selected from a static mixer, a conductivity sensor, a pH sensor, a pressure sensor, an electrical grounding element, a redox sensing element, a temperature sensor, a capacitive sensor, a flow sensor, an optical sensor, and an element for taking liquid samples.

11. The system of claim 10, wherein the functional element is mounted in the opening extending with a probe end into the chamber, wherein the probe end extending into the chamber is positioned such that it keeps a distance to wall parts of the chamber of about 12 mm or more.

12. The system according to claim 1, wherein the cross-sectional area of the fluid flow path along the flow channel corresponds essentially to the cross-sectional area in the first and second tubular connectors.

13. The system according to claim 2, wherein said tubular connectors are formed integrally with the body.

14. The system according to claim 3, wherein said body and/or said tubular connectors of the flow cell are made of stainless steel.

15. The system according to claim 3, wherein said body and/or said tubular connectors of the flow cell are polycarbonate, polypropylene, polysulfone, polyethersulfone, polybutylene terephthalate, polyethylene terephthalate, polyetherether ketone, polyetherimide, low density polyethylene, high density polyethylene, and/or silicone.

16. The system of claim 11, wherein said functional element is selected from a conductivity sensor and a pH sensor.

17. The system of claim 16, wherein all dimensions of the chamber perpendicular to the direction of the sensor with its probe end extends into the chamber is about 25 mm or more.

18. The system of claim 16, wherein all dimensions of the chamber perpendicular to the direction of the sensor with its probe end extended into the chamber is between about 28 mm and about 50 mm.

* * * * *